2 Sheets—Sheet 1.

C. F. BENZ.
Potato-Digger.

No. 216,822.      Patented June 24, 1879.

WITNESSES.
Chas. E. Hibbard
Amos F. Chase

INVENTOR.
Chas. F. Benz
Chas. B. Tilden
Attorney

2 Sheets—Sheet 2.

C. F. BENZ.
Potato-Digger.

No. 216,822.     Patented June 24, 1879.

WITNESSES.
Chas. E. Hibbard
Amos F. Chase,

INVENTOR.
Chas. F. Benz
Chas. B. Tilden
Attorney

UNITED STATES PATENT OFFICE.

CHARLES F. BENZ, OF BOSTON, MASSACHUSETTS.

IMPROVEMENT IN POTATO-DIGGERS.

Specification forming part of Letters Patent No. 216,822, dated June 24, 1879; application filed January 27, 1879.

*To all whom it may concern:*

Be it known that I, CHAS. F. BENZ, a resident of Boston, county of Suffolk, and State of Massachusetts, have invented an Improvement in Machines for Digging Potatoes, of which the following is a specification.

My invention relates to improvements in apparatus for digging potatoes by means of automatic mechanism, whereby they are unearthed, the adhering soil removed, and the potatoes discharged into a suitable receptacle, while the dirt and rubbish are dropped upon the surface of the field.

My invention consists in certain new combinations of mechanism, which will first be described, and then particularly pointed out in the claims.

Figure 1:
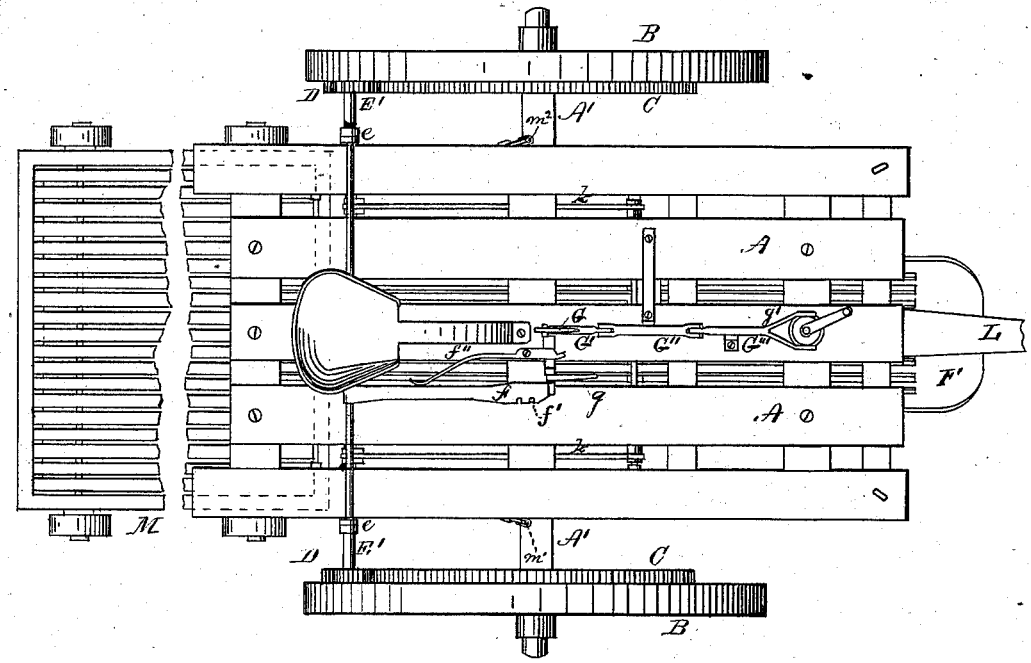
Figure 2:
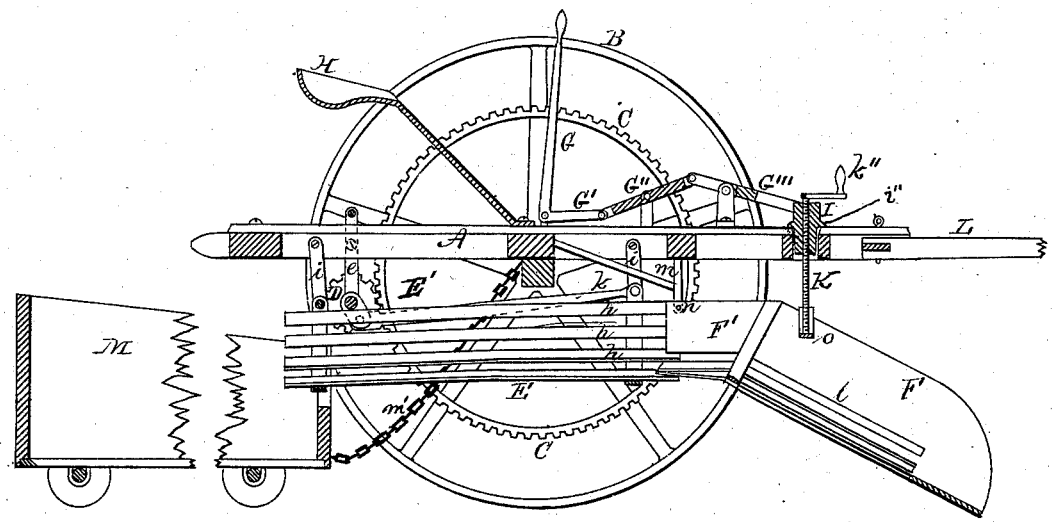
Figure 3:
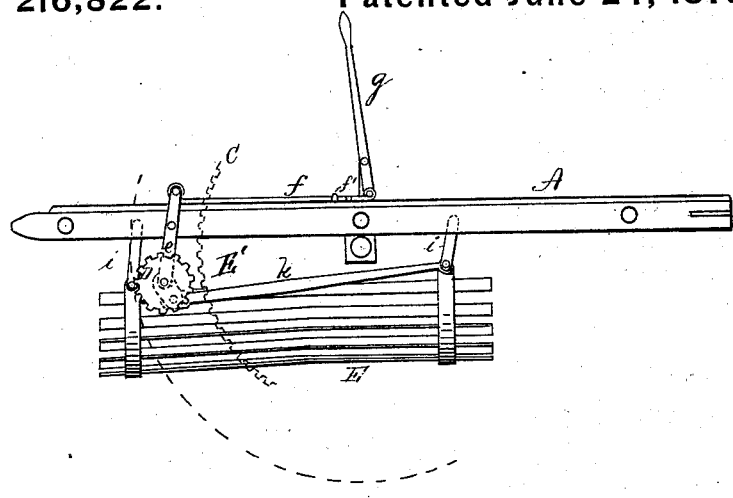
Figure 4:
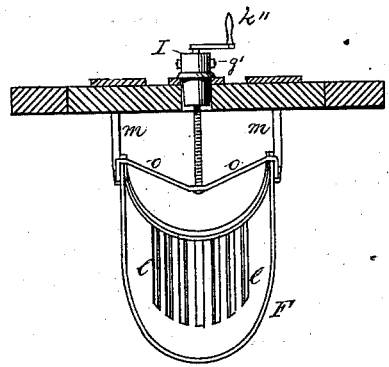

Referring to the drawings forming part of this application, Figure 1 is a plan view, illustrating my invention. Fig. 2 is a section taken upon the central longitudinal line of Fig. 1. Figs. 3 and 4 are detail views, showing separate combinations of mechanism forming part of my invention.

The object of this invention is to provide an apparatus which may be driven over the field where the potatoes are planted, and which shall separate them from the soil in which they lie, remove the adhering earth, and discharge them into a suitable receptacle attached to the machine.

To this end I construct a strong platform, A, composed of planking, bolted together and mounted upon an axle, A', provided with broad wheels B. To each of these wheels is attached a gear, C, adapted to engage with a pinion, D, the latter being so arranged upon swinging arms or brackets *e* that it can readily be thrown in and out of gear with the wheels C, the necessary movement being effected by a lever, *g*, Fig. 3, placed near the center of the platform B, and connected with the swinging brackets *e* by a rod, *f*, which is notched (see Fig. 1) to engage with a pin, *f'*, by which the pinion D is held firmly either in or out of engagement with the gear C, the notched rod *f* being held against the pin *f'* by the spring *f''*.

Beneath the platform A is hung a hopper, E, composed of metal strips or plates *h*, Fig. 2, a narrow space being left between each strip. This hopper is open at both ends, and is hung to the platform A by pivoted links *i*. To one pair of these links I connect the pitman-rods *k k*, which are operated by cranks upon the shaft E, which carries the pinions D. When the latter are in engagement with the gear C a rapid longitudinal vibration of the hopper E is caused, this movement being nearly in a short arc of a circle having a radius equal to the links *i*.

Directly in front of the hopper E is placed the digger F. This is made of a sheet of metal of suitable thickness bent into the form shown in Figs. 2 and 4.

A portion of the body is slotted to correspond with the spaces between the bars or plates *h* of the hopper E, as shown at *l*. To this digger I attach a chute, F', which is so placed as to discharge directly into the forward end of the hopper E. This digger and chute are strongly connected to the platform A by means of the pendants *m*, which are pivotally connected to the rear part of the chute F' at the point *n*, Fig. 2, the object being to enable the operator to raise or lower the nose of the digger in such manner as to free it from the ground altogether, or to adapt it for digging in different depths of soil. This I accomplish in two ways—first, by means of the lever G, placed within easy reach of the operator, who rides upon the machine, in the seat H. This lever is a bell-crank, the horizontal arm G' being pivoted to the balance-lever G'', and the latter, in turn, to the second and similar lever, G'''.

The lever G''' is forked at its end *g'*, the forked branches having short slots, which receive pivots formed upon the lift I. The latter is provided with a central screw-threaded perforation to receive the screw K, which is swiveled to a brace, *o*, having its ends pivoted to the upper and rear part of the digger F. The screw K is provided at its upper extremity with a crank, *k''*. It is obvious that by drawing the lever G backward the forward extremity of the lever G''' will be raised, lifting with it the screw K, which draws up the digger, the ends of the brace *o* being pivoted to allow the digger F to turn upon its pivotal point *n*. In this manner the device may be in an instant and by a single movement raised entirely free of the earth.

Another mode of adjustment is by means of the screw K, already described. By turning the crank $k'''$ the operator may force the point of the digger downward or raise it to any desired distance. It will be noticed that the lift I is provided with a flange, $i''$, which rests upon the platform A, said flange receiving the strain produced by the action of the digger upon the soil.

The method of adjusting the digger which I have first described is intended to be used when the machine is being driven to and from the field, or for the purpose of avoiding some unusual obstruction, such as roots, stumps, stones, &c. The latter method is more especially adapted for adjusting the digger while the machine is in operation.

At the rear or discharge end of the chute E is arranged a wheeled receptacle, M, adapted to receive the potatoes as discharged from said chute. This receptacle is provided with four wheels, and is detachably connected by chains $m^1$ to the cross-bar A' of the frame, hooks or links of the chain engaging with pins $m^2$ projecting from said cross-bar. The bottom of the receptacle M is slotted, in order to permit the earth to be thoroughly sifted from the potatoes. When the receptacle is filled it can be detached and hauled to a proper place to deposit its load without requiring the machine to leave the field.

The operation of the machine is as follows: A team being harnessed to the tongue L, and the operator mounted upon the seat H, the apparatus is driven to the field, the pinion D being thrown out of gear with the gear-wheel C by means of the lever $g$, and the digger being raised far enough to avoid all possibility of contact with the earth by means of the lever G. When the field is reached the digger is lowered, the pinion D thrown into gear, and the machine is driven from one side of the field to the other, the wheels straddling the hills in such manner as to cause the digger F to plow directly through them, the nose of the digger being depressed somewhat below the depth at which the potatoes lie buried. The earth being torn up by the digger is, together with the potatoes mingled therewith, forced up the inclined surface of the digger, passing over the slotted portion $l$, through which a considerable portion of the dirt falls back upon the surface of the field. The potatoes, with the remaining soil, are carried up into the chute F', from which they are discharged into the vibrating hopper E. The latter having a rapid reciprocating movement, as has already been described, in the arc of a small circle, imparts a violent motion to the potatoes, rolling them over each other, and throwing them a few inches into the air, by which means the soil adhering to them is wholly removed, pulverized, and discharged through the openings between the bars $h$ of the hopper. Finally the potatoes thus separated and cleansed from the soil are discharged from the rear end of the hopper into the receptacle M, which is drawn after the machine.

I am aware that it is not new to employ a gear-wheel meshing with a pinion arranged on a crank-shaft which is connected with a hopper in order to continuously vibrate the latter; and, further, I am aware that it is not broadly new to throw a pinion out of mesh with a gear-wheel that operates a crank-shaft, and such, broadly, I disclaim.

Having thus fully described my invention, what I claim as new, and desire to secure by Letters Patent of the United States, is—

1. In a potato-digger, the combination, with the gear-wheel C and the hopper E, of the pinion D, pitman K, crank-shaft E', swinging arms $e$ and $i$, notched rod $f$, and lever $g$, arranged for operation substantially as shown and described.

2. The combination, with the digging-scoop F, vibrating hopper E, and wheels B, having gears C, of the pinions D, crank-shaft E', lever $g$, bell-crank G, lift I, and screw K, all in the manner and for the purpose set forth.

In testimony whereof I have signed my name to this specification in the presence of two subscribing witnesses.

CHARLES F. BENZ.

Witnesses:
   CHAS. E. HIBBARD,
   AMOS F. CHASE.